United States Patent
Kitamura et al.

(10) Patent No.: US 6,777,061 B2
(45) Date of Patent: Aug. 17, 2004

(54) MAGNETIC RECORDING MEDIUM AND PROCESS FOR PRODUCING THE SAME

(75) Inventors: Kenichi Kitamura, Nagano (JP); Takayoshi Kuwajima, Saku (JP); Sadafumi Iijima, Yamanashi (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/397,846

(22) Filed: Mar. 27, 2003

(65) Prior Publication Data

US 2004/0023067 A1 Feb. 5, 2004

(30) Foreign Application Priority Data

Mar. 29, 2002 (JP) ........................................ 2002-093741

(51) Int. Cl.⁷ ............................................... G11B 5/714

(52) U.S. Cl. ........................ 428/141; 428/323; 428/329; 428/336; 428/694 BS; 428/694 BA; 428/694 BC; 428/694 BR; 427/131

(58) Field of Search .................................. 428/141, 323, 428/329, 336, 694 BS, 694 BA, 694 BC, 694 BR; 427/131

(56) References Cited

FOREIGN PATENT DOCUMENTS

| | | | |
|---|---|---|---|
| JP | 6-176345 | A1 | 6/1994 |
| JP | 10-308014 | A1 | 11/1998 |
| JP | 10-334450 | A1 | 12/1998 |
| JP | 11-3517 | A1 | 1/1999 |
| JP | 2000-215439 | A1 | 8/2000 |

*Primary Examiner*—Stevan A. Resan
(74) *Attorney, Agent, or Firm*—Rader, Fishman & Grauer PLLC

(57) ABSTRACT

The present invention provides a high recording density magnetic recording medium with improved dropout and excellent surface smoothness and electromagnetic conversion characteristics, as well as a process for producing such a medium. A magnetic recording medium comprising a lower non-magnetic layer containing at least a non-magnetic powder and a binder resin on one surface of a non-magnetic support, an upper magnetic layer containing at least a ferromagnetic powder and a binder resin on said lower non-magnetic layer, and a back coat layer on an opposite surface of said non-magnetic support, wherein said lower non-magnetic layer contains an acicular powder of hydrated iron oxide as the non-magnetic powder, said ferromagnetic powder has an average long axial length of 0.1 $\mu$m or less, and said upper magnetic layer has a surface roughness (center line average roughness: Ra) of 2.4 nm or less. After curing the lower non-magnetic layer, the magnetic layer is applied and formed.

6 Claims, No Drawings

MAGNETIC RECORDING MEDIUM AND PROCESS FOR PRODUCING THE SAME

BACKGROUND OF THE INVENTION

1. Field of the Invention

The present invention relates to a magnetic recording medium, and more specifically to a high recording density magnetic recording medium with improved dropout and excellent surface smoothness and electromagnetic conversion characteristics.

2. Disclosure of the Related Art

In recent years, the magnetic recording media for digital recording to release from signal deterioration arising from repeated copying have become common. Furthermore, in order to cope with increases in recording data volumes, magnetic recording media with increased recording densities are required. In order to increase the recording density, factors such as media thickness loss and self-demagnetizing loss must be considered, and for these reasons, it is desired to reduce in the film thickness of the magnetic layer.

However, when the thickness of the magnetic layer is reduced, the surface roughness of the support is reflected on the surface of the magnetic layer, causing a loss of smoothness in the magnetic layer surface, and a deterioration of the electromagnetic conversion characteristics. Consequently, on the surface of the support a non-magnetic layer is provided, for example, as an undercoat layer, and the magnetic layer is then provided with this non-magnetic layer intervening. As a result, the surface of this lower non-magnetic layer provided beneath the magnetic layer must be formed with smooth.

Furthermore, during heat curing which is conducted in a rolled state during production of the magnetic medium, and during storage in a high temperature, high humidity environment following production, transfer occurs from the back coat layer to the surface of the magnetic layer, causing a deterioration in the surface smoothness of the magnetic layer, and a degrading of the electromagnetic conversion characteristics.

Japanese Patent Laid-Open Publication No. Hei 10-334450 discloses a magnetic recording medium in which the lower non-magnetic layer contains acicular particles of hydrated iron oxide dispersed in a binder, wherein the acicular particles of hydrated iron oxide have the average long axial length of 0.2 $\mu$m or less, and the average short axial length of 0.04 $\mu$m or less. However, according to the technique in this publication, by employing a lower non-magnetic layer comprising particles of hydrated iron oxide, the surface of the magnetic layer formed thereon does not form an excessively specular state, and a suitable surface state can be achieved. Specifically, the examples presented in this publication disclose magnetic recording media in which the surface roughness (Ra) of the lower non-magnetic layer is within a range from 2.3 to 2.6 nm, and the surface roughness (Ra) of the magnetic layer is from 2.5 to 2.8 nm. In other words, no investigations were conducted on ultra smooth magnetic layers with a surface roughness of 2.4 $\mu$m or less. Furthermore, the variation of the surface roughness of the magnetic layer between before and after heat curing was not evaluated. In addition, a magnetic powder with an average long axial length of 0.24 $\mu$m is used. In a magnetic powder with a long axial length of this length, the filling factor is unsatisfactory, and an ultra smooth magnetic layer is difficult to achieve. Accordingly, a medium with electric conversion characteristics capable of coping with high recording densities and with improved dropout cannot be obtained.

Japanese Patent Laid-Open Publication No. Hei 10-308014 discloses a magnetic recording medium comprising a magnetic layer of thickness 0.2 $\mu$m formed on top of a non-magnetic layer comprising iron oxyhydroxide and a binder, which is provided on a non-magnetic support. However, according to the examples in this publication, the surface roughness (Ra) of the magnetic layer is within a range from 3.1 to 6.1 $\mu$m, and no investigations were conducted on ultra smooth magnetic layers. In addition, the layered application of the non-magnetic layer and the magnetic layer is conducted using a wet-on-wet system.

Japanese Patent Laid-Open Publication No. Hei 11-3517 discloses a magnetic recording medium comprising a magnetic layer of thickness 0.2 $\mu$m formed on top of a non-magnetic layer comprising iron oxyhydroxide and a binder containing polar functional groups, which is provided on a non-magnetic support. However, according to the examples in this publication, the surface roughness (Ra) of the magnetic layer is within a range from 3.6 to 3.8 $\mu$m, and no investigations were conducted on ultra smooth magnetic layers. In addition, the layered application of the non-magnetic layer and the magnetic layer is conducted using a wet-on-wet system.

SUMMARY OF THE INVENTION

An object of the present invention is to provide a high recording density magnetic recording medium with improved dropout and excellent surface smoothness and electromagnetic conversion characteristics, as well as a process for producing such a medium.

As a result of intensive investigation, the inventors of the present invention discovered that by using a lower non-magnetic layer containing an acicular powder of hydrated iron oxide as a non-magnetic powder, and an upper magnetic layer containing a ferromagnetic powder with an average long axial length of 0.1 $\mu$m or less, and by applying the upper magnetic layer following curing of the lower non-magnetic layer, a high recording density magnetic recording medium with improved dropout and excellent electromagnetic conversion characteristics could be obtained, with an ultra smooth magnetic layer surface with a surface roughness (Ra) of 2.4 nm or less, a level of which has proved extremely difficult to achieve with conventional techniques, and the inventors were hence able to complete the present invention.

In other words, the present invention incorporates the following aspects.

(1) A magnetic recording medium comprising a lower non-magnetic layer containing at least a non-magnetic powder and a binder resin on one surface of a non-magnetic support, an upper magnetic layer containing at least a ferromagnetic powder and a binder resin on the lower non-magnetic layer, and a back coat layer on an opposite surface of the non-magnetic support, wherein the lower non-magnetic layer contains an acicular powder of hydrated iron oxide as the non-magnetic powder, the ferromagnetic powder has an average long axial length of 0.1 $\mu$m or less, and the upper magnetic layer has a surface roughness (center line average roughness: Ra) of 2.4 nm or less.

(2) The magnetic recording medium according to the aspect (1), wherein the acicular powder of hydrated iron oxide has an average long axial length of 0.15 $\mu$m or less.

(3) The magnetic recording medium according to the aspect (1) or (2), wherein the lower non-magnetic layer has a surface roughness (center line average roughness: Ra) of 2.7 nm or less.

(4) The magnetic recording medium according to any one of the aspects (1) through (3), wherein the binder resin of the lower non-magnetic layer is a radiation curing type binder resin.

(5) The magnetic recording medium according to any one of the aspects (1) through (4), wherein the upper magnetic layer has a thickness of 0.2 μm or less.

(6) The magnetic recording medium according to any one of the aspects (1) through (5), wherein the upper magnetic layer is provided on the lower non-magnetic layer following curing of the lower non-magnetic layer.

(7) A process for producing a magnetic recording medium comprising the steps of:

forming a lower non-magnetic layer by applying a non-magnetic layer coating material containing at least a non-magnetic powder containing an acicular powder of hydrated iron oxide and a binder resin to one surface of a non-magnetic support, and then drying and curing the coating material;

forming an upper magnetic layer by applying a magnetic layer coating material containing at least a ferromagnetic powder having an average long axial length of 0.1 μm or less and a binder resin onto the lower non-magnetic layer, and then drying the coating material;

forming a back coat layer by applying a back coat layer coating material to an opposite surface of the non-magnetic support, and then drying the coating material; and conducting heat curing treatment following completion of the above steps.

This method enables the production of a magnetic recording medium with an upper magnetic layer having a surface roughness (center line average roughness: Ra) of 2.4 nm or less.

Examples of the acicular powder of hydrated iron oxide include acicular α-FeOOH (goethite), acicular β-FeOOH (akaganeite), and acicular γ-FeOOH (lepidocrocite), and of these, acicular goethite is preferred. Furthermore, mixtures of the above materials may also be used.

Goethite is an intermediate in the production of α-$Fe_2O_3$ (hematite), and hematite is produced by high temperature dehydration treatment of goethite. Accordingly, because the production of goethite does not require the same type of high temperature treatment used in the production of hematite, problems of inter-particle sintering do not arise, and the goethite displays excellent dispersibility. Accordingly, the acicular powder of hydrated iron oxide displays excellent dispersibility.

In the present invention, because the non-magnetic layer contains an acicular powder of hydrated iron oxide with excellent dispersibility, the surface smoothness of the lower non-magnetic layer improves, and a strong coating film is formed with the acicular particles overlapping in a mesh type network. The surface roughness (Ra) of the lower non-magnetic layer is, for example, 2.7 nm or less, and is preferably within a range from 1.0 to 2.1 nm.

In the present invention, in order to achieve formation of a magnetic layer with an ultra smooth surface, application and formation of the upper magnetic layer is performed following curing of the lower non-magnetic layer. Furthermore, by using a ferromagnetic powder with a short long axial length in the magnetic layer, the filling factor of the coating film improves, and it is thought that the coating film is less susceptible to transfer from the back coat layer during heat curing in the production process, and during storage in a high temperature, high humidity environment following production. As a result, the surface of the magnetic layer can be maintained in an ultra smooth state.

Use of either one of the non-magnetic layer comprising the acicular powder of hydrated iron oxide and the magnetic layer of a ferromagnetic powder having a long axial length of 0.1 μm or less does not produce a satisfactory effect, but the simultaneous use of both layers enables a satisfactory effect to be achieved. For example, if the acicular goethite of the non-magnetic layer is replaced with acicular hematite, then not only is the desired surface smoothness unobtainable, but the surface roughness following heat curing during the production of the medium also deteriorates. Similarly, if the long axial length of the ferromagnetic powder exceeds 0.1 μm, then the surface roughness following heat curing during the production of the medium deteriorates.

In other words, only by satisfying the conditions of the present invention, deterioration in the surface smoothness caused by transfer from the back coat layer can be prevented, enabling the electromagnetic conversion characteristics and the dropout to be improved.

According to the present invention, a high recording density magnetic recording medium is provided which displays improved dropout, excellent electromagnetic conversion characteristics, and has the type of ultra smooth magnetic layer surface which has proved extremely difficult to achieve with conventional techniques.

DETAILED DESCRIPTION OF THE INVENTION

Now, the specific configurations of the present invention will be described in detail thereafter.

The magnetic recording medium of the present invention has at least two coating layers on one surface of a non-magnetic support, that is, a lower non-magnetic layer and preferably an upper magnetic layer having a thickness of 0.2 μm or less formed in this order, and on the another surface of the non-magnetic support, a back coat layer is formed. Further, in the present invention, a lubricant coating layer, and/or various coating layers for protecting the magnetic layer may be formed on the upper magnetic layer as required. Also, on the surface of the non-magnetic support, on which the magnetic layer is to be formed, an undercoat layer (adhesion facilitating layer) may be formed for improving adhesion between the coating layer and the non-magnetic support.

Lower Non-magnetic Layer

In the present invention, in order to obtain a magnetic recording medium with an ultra smooth magnetic layer surface and excellent electromagnetic conversion characteristics it is extremely important that the lower non-magnetic layer to become the magnetic layer has a smooth surface. In cases in which the magnetic layer is extremely thin, the surface roughness of the magnetic layer is affected by the surface roughness of the lower non-magnetic layer. In order to ensure a surface roughness (Ra) for the magnetic layer of 2.4 nm or less, the surface roughness (Ra) of the non-magnetic layer should be 2.7 nm or less, and preferably 2.1 nm or less. Consequently, in the present invention, the lower non-magnetic layer contains an acicular powder of hydrated iron oxide with excellent dispersibility, preferably acicular goethite, as the non-magnetic powder. As a result, the surface smoothness of the lower non-magnetic layer improves, and a strong coating film is formed with the acicular particles overlapping in a mesh type network.

In addition, the acicular powder of hydrated iron oxide also provides the effect described below. Namely, because an acicular powder of hydrated iron oxide displays a high adsorption of fatty acids, which function as lubricants, by using an acicular powder of hydrated iron oxide as the non-magnetic powder, a large quantity of fatty acids with an excellent lubricating effect can be added to the lower non-magnetic layer. Furthermore fatty acid amides, which also display an excellent lubricating effect, do not readily adsorb to inorganic pigments such as acicular powder of hydrated iron oxide or hematite, and consequently if no fatty acids are present, the addition of a large quantity of fatty acid amide would cause blooming from the medium. However, if fatty acids are present, then large quantities of fatty acid amides can be added to the lower non-magnetic layer. In other words, in the present invention, by using an acicular powder of hydrated iron oxide as the non-magnetic powder, large quantities of fatty acids can be added, and as a result, comparatively large quantities of fatty acid amides can be added. Accordingly, suitable and sufficient quantities of the fatty acids and the fatty acid amides can be supplied from the lower non-magnetic layer to the magnetic layer over an extended period of time, ensuring an excellent lubricating effect, and enabling an improvement in the durability of the medium.

The acicular powder of hydrated iron oxide preferably has the average long axial length of 0.15 μm or less, and is even more preferably within a range from 0.05 to 0.10 μm. If the average long axial length exceeds 0.15 μm, then the surface smoothness of the non-magnetic layer tends to deteriorate. At long axial length values of less than 0.05 μm, the dispersibility worsens, and as a result the surface smoothness of the non-magnetic layer tends to deteriorate.

In the present invention, the average long axial lengths of the ferromagnetic powder and the acicular powder of hydrated iron oxide may be determined by separating the ferromagnetic powder and the acicular powder of hydrated iron oxide from a tape fragment, extracting a sample of each material, and then measuring the long axial length of each powder from a photograph taken using a transmission type electron microscope (TEM). An example of the sequence involved in such a measurement is described below. (1) Using a solvent, the back coat layer is wiped and removed from a tape fragment. (2) The remaining tape fragment sample, comprising the lower non-magnetic layer and the upper magnetic layer formed on the non-magnetic support, is placed in a 5% NaOH solution and then heated and stirred. (3) The coating films removed from the non-magnetic support are washed in water and dried. (4) The removed coating films are treated with ultrasound in methyl ethyl ketone (MEK), and then a magnet stirrer is used to adsorb and collect the ferromagnetic powder. (5) The acicular powder of hydrated iron oxide is separated from the residue and dried. (6) Using a special mesh, a sample is taken from each of the powders obtained in (4) and (5) to prepare TEM samples, and these acicular powders are then photographed using TEM. (7) The long axial length of the acicular powder in each photograph is measured and averaged (n=100).

The quantity of the acicular powder of hydrated iron oxide is from 40 to 80% by weight, and preferably from 45 to 75% by weight of the lower non-magnetic layer. At quantities less than 40% by weight, the quantity is too insufficient as the non-magnetic powder, and holding the desired quantity of lubricant becomes difficult. In contrast, if 80% by weight is used then the quantity is satisfactory as the non-magnetic powder and a satisfactory quantity of lubricant can be held. If quantities exceeding 80% by weight are used then the proportion of the binder resin in the lower non-magnetic layer falls too far and a satisfactory coating film strength cannot be achieved.

The lower non-magnetic layer contains carbon black. The carbon black has a function of holding the lubricant. However, in comparison with the acicular powder of hydrated iron oxide described above, this holding action is very small. Also, the carbon black of the lower non-magnetic layer has an effect to lower the surface electric resistance of the upper magnetic layer as well as an effect to reduce the light transmittance.

Examples of carbon black contained in the non-magnetic layer include furnace black for rubber, thermal black for rubber, black for color, acetylene black, etc. Preferably the carbon black has a specific surface area of 5 to 600 $m^2/g$, a DBP oil absorption of 30 to 400 mL/100 g, and a particle size of 10 to 100 nm. The carbon black which may be used may be referred specifically to "Carbon Black Almanac," compiled by the Society of Carbon Black.

In addition to the acicular powder of hydrated iron oxide and carbon black, the non-magnetic layer may also contain as appropriate a variety of inorganic powders, provided that the inclusion of such powders does not impair the effects of the present invention. Examples of such inorganic powders include non-magnetic powders such as non-magnetic iron oxide (hematite), calcium carbonate, titanium oxide, barium sulfate, and aluminum oxide ($\alpha$-$Al_2O_3$).

The quantity of carbon black is from 5 to 40% by weight, and preferably from 7 to 35% by weight of the lower non-magnetic layer. In the present invention, because the acicular powder of hydrated iron oxide, and preferably acicular goethite, holds the lubricants, the carbon black content may be held to a value within the above range.

In the present invention, the lower non-magnetic layer preferably contains known lubricants such as fatty acids, fatty acid amides, fatty acid esters, and saccharides. Either a single lubricant, or mixtures of two or more lubricants may be used. The use of a mixture of two or more fatty acids with different melting points, or a mixture of two or more fatty acid amides with different melting points, or a mixture of two or more fatty acid esters with different melting points is also preferred. The reason for this preference is that lubricants which correspond with all temperature environment in which the medium is being used need to be supplied continuously to the surface of the medium.

Specifically, in the case of fatty acids, saturated straight chain fatty acids such as stearic acid, palmitic acid, myristic acid, lauric acid, and erucic acid; saturated fatty acids with side chains such as isocetylic acid, and isostearic acid; and unsaturated fatty acids such as oleic acid, linoleic acid, and linolenic acid may be used as appropriate. Of these, from the viewpoints of improving tape running and limiting blooming from the medium surface, stearic acid is preferred. Combinations of stearic acid and palmitic acid are also desirable. The fatty acids such as stearic acid, palmitic acid, and myristic acid are difficult to obtain industrially as high purity materials, and often contain other fatty acids with different numbers of carbon atoms as impurities.

Examples of the fatty acid amides include the amides of the fatty acids described above, and more specifically, stearic acid amide, palmitic acid amide, myristic acid amide, lauric acid amide, erucic acid amide, isocetylic acid amide, isostearic acid amide, oleic acid amide, linoleic acid amide, and linolenic acid amide may be used as appropriate. Of these, from the viewpoints of improving tape running and limiting blooming from the medium surface, stearic acid amide is preferred. Combinations of stearic acid amide and palmitic acid amide are also desirable. The fatty acid amides such as stearic acid amide, palmitic acid amide, and myristic acid amide are difficult to obtain industrially as high purity materials, and often contain other fatty acid amides with different numbers of carbon atoms as impurities.

Examples of the fatty acid esters include straight chain saturated fatty acid esters such as butyl stearate and butyl palmitate; saturated fatty acid esters with side chains such as isocetyl stearate and isostearyl stearate; unsaturated fatty acid esters such as isostearyl oleate; fatty acid esters of unsaturated alcohols such as oleyl stearate; esters of an unsaturated fatty acid and an unsaturated alcohol such as oleyl oleate; esters of bivalent alcohols such as ethylene glycol distearate; esters of a bivalent alcohol and an unsaturated fatty acid such as ethylene glycol monooleate, ethylene glycol dioleate, and neopentyl glycol dioleate; and esters of a saccharide and a saturated or unsaturated fatty acid such as sorbitan monostearate, sorbitan tristearate, sorbitan monooleate, and sorbitan trioleate.

The quantity of lubricant in the lower non-magnetic layer may be suitably adjusted in accordance with the intended effect, although with respect to 100 parts by weight of the acicular powder of hydrated iron oxide, 0.8 to 4 parts by weight of fatty acid are preferred, and 0.4 to 2 parts by weight of fatty acid amide are preferred. If large quantities of fatty acid are used relative to the quantity of the acicular powder of hydrated iron oxide, then problems of blooming from the medium surface become more likely. If too large quantities of fatty acid amide are used relative to the quantity of fatty acid, then problems of blooming from the medium surface become more likely. Furthermore, when fatty acid esters are used, the quantity of the ester is preferably within a range from 0.5 to 4 parts by weight with respect to 100 parts by weight of the acicular powder of hydrated iron oxide. If overly large quantities of fatty acid ester are used relative to the quantity of the acicular powder of hydrated iron oxide, then problems of blooming from the medium surface become more likely.

In the present invention, the binder resin for the non-magnetic layer may utilize a reactive heat curing type binder resin, although use of a radiation curing type binder resin is extremely effective as it enables cross linking of the binder resin to be increased significantly.

Examples of the radiation curing type binder resin used in the present invention are resins with at least one unsaturated double bond within the molecular chain, which undergo curing by generating radicals through irradiation, leading to cross linking or polymerization.

Examples of radiation curing type binder resin include vinyl chloride type resin, polyurethane resin, polyester resin, epoxy type resin, phenoxy resin, fiber type resin, polyether type resin, polyvinyl alcohol type resin, and many other resins. Of these, vinyl chloride type resin and polyurethane resin are typical, and it is preferable to use the both in combination.

The radiation curing vinyl chloride type resin is synthesized according to known methods by modifying a vinyl chloride type resin as raw material to radiation functional type resin. For the vinyl chloride type resin as raw material, the vinyl chloride type resin of which vinyl chloride content is 60 to 100% by weight, and preferably 60 to 95% by weight in particular. Examples of such vinyl chloride type resin include vinyl chloride-vinyl acetate-vinyl alcohol copolymer, vinyl chloride-hydroxyalkyl (meth) acrylate copolymer, vinyl chloride-vinyl acetate-maleic acid copolymer, vinyl chloride-vinyl acetate-vinyl alcohol-maleic acid copolymer, vinyl chloride-hydroxyalkyl (meth) acrylate-maleic acid copolymer, vinyl chloride-vinyl acetate-vinyl alcohol-glycidyl (meth) acrylate copolymer, vinyl chloride-hydroxyalkyl (meth) acrylate-glycidyl (meth) acrylate copolymer, vinyl chloride-hydroxyalkyl (meth) acrylate-allyl glycidyl ether copolymer, vinyl chloride-vinyl acetate-vinyl alcohol-allyl glycidyl ether copolymer, and the like. Especially, a copolymer of vinyl chloride and a monomer which contains epoxy(glycidyl) group is preferable. And, the average polymerization degree of the copolymer is preferably 100 to 900, and more preferably 100 to 600.

Furthermore, in order to improve dispersibility, it is preferable to introduce polar groups such as —$SO_4M$, —$SO_3M$, —POM, —$PO_2M$, —$PO_3M$, —COOM (M represents H or alkaline metal), —SR, —$NR_2$, —$N^+R_3Cl^-$ (R represents H or hydrocarbon group), phosphobetaine, sulfobetaine, phosphamine, sulfamine, and the like into the copolymer by optional methods as required. Also, to improve heat stability, an introduction of epoxy group is preferable.

The radiation curing polyurethane resin (polyurethane acrylate resin) is generally obtained by a reaction of a resin containing hydroxy group and an acrylic type compound containing hydroxyl group and a compound containing polyisocyanate.

Examples of the resin containing hydroxy group include polyalkylone glycols such as polyethylene glycol, polybutylene glycol, polypropylene glycol, and the like, alkylene oxide adduct of bisphenol A, polyether polyols which has various kinds of glycols and hydroxyl groups at the terminal of the molecular chain. Of these, a polyurethane acrylate resin obtained by using polyether polyol as one component is preferable.

Examples of carboxylic acid component of polyether polyol include aromatic dicarboxylic acids such as terephthalic acid, isophthalic acid, orthophthalic acid, 1,5-naphthalic acid, and the like, aromatic oxycarboxylic acids such as p-oxybenzoic acid, p-(hydroxyethoxy)benzoic acid, and the like, aliphatic dicarboxylic acids such as succinic acid, adipic acid, azelaic acid, sebacic acid, dodecanoic dicarboxylic acid, and the like, unsaturated aliphatic acids and alicyclic dicarboxylic acids such as fumaric acid, maleic acid, itaconic acid, tetrahydrophthalic acid, hexahydrophthalic acid, and the like, tri- or tetra-carboxylic acids such as trimellitic acid, trimesic acid, pyromellitic acid, and the like.

Examples of glycol component of the polyether polyol include ethylene glycol, propylene glycol, 1,3-propanediol, 1,4-butanediol, 1,5-pentanediol, 1,6-hexanediol, neopentyl glycol, diethylene glycol, diproylene glycol, 2,2,4-trimethyl-1,3-pentanediol, 1,4-cyclohexanedimethanol, ethylene oxide adducts and propylene oxide adducts of bisphenol A, etc., ethylene oxide and propylene oxide adduct of hydrogenated bisphenol A, polyethylene glycol, polypropylene glycol, polytetramethylene glycol, and the like. Also, tri- or tetra-ols such as trimethylolethane, trimetylolpropane, glycerin, pentaerythritol, and the like may be used in combination.

Examples of polyether polyol include, in addition to the examples mentioned above, lactone type polyesterdiol chain obtained by ring opening polymerization of lactone such as caprolactone.

Examples of polyisocyanate used include diisocyanate compounds such as 2,4-tolylene diisocyanate, 2,6-tolylene diisocyanate, p-phenylene diisocyanate, biphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-demethyl-4,4'-biphenylene diisocyanate, 4,4'-diphenylene diisocyanate, 4,4'-diisocyanate-diphenyl ether, 1,5-naphthalene diisocyanate, p-xylylene diisocyanate, m-xylylene diisocyanate, 1,3-diisocyanate methylcyclohexane, 1,4-isocyanate methylcyclohexane, 4,4'-diisocyanate dicyclohexane, 4,4'-diisocyanate cyclohexylmethane, isophorone diisocyanate, and the like, or triisocyanate compounds such as 2,4-tolylene diisocyanate-trimer, hexamethylene diisocyanate-trimer of 7 or lower mol % in all isocyanate groups, and the like.

Furthermore, in order to improve dispersibility, it is preferable to introduce polar groups such as —$SO_4M$, —$SO_3M$, —POM, —$PO_2M$, —$PO_3M$, —COOM (M represents H or alkaline metal), —SR, —$NR_2$, —$N^+R_3Cl^-$ (R represents H or hydrocarbon group), phosphobetaine, sulfobetaine, phosphamine, sulfamine, and the like into the copolymer by optional methods as required. Also, to improve heat stability, an introduction of epoxy group is preferable.

On the other hand, apart from the above synthetic method of the radiation curing type urethane, modification of reactive thermosetting type polyurethane resin as raw material to radiation functional type resin may be carried out, by using hydroxyl group thereof in a known method.

Also, a radiation curing type monomer or an oligomer may be used as required, and the use of them enables the coating layer to have a higher crosslinking degree. The additional content is preferably 30 parts by weight or less, and more preferably 20 parts by weight or less with respect to the resin contained in the lower non-magnetic layer coating material. When the content exceeds 30 parts by weight, the coating material is given a strong influence and this conversely results in a lower gloss. The radiation curing type monomer or oligomer may be added either after preparing the coating material or the time of dispersing.

The coating material for forming the non-magnetic layer is prepared by adding an organic solvent to the above-mentioned components. There is no particular limit to the organic solvent used, and one or two kinds or more of various solvents such as ketone type solvents such as MEK, methyl isobutyl ketone, cyclohexanone, etc., or aromatic type solvents such as toluene, etc. may be suitably chosen and used. The amount of organic solvent added may be about 100 to 900 parts by weight with respect to 100 parts by weight of a total amount of solids (carbon black and various inorganic powders, etc.) and the binder.

When the radiation curing type binder resin is used for the non-magnetic layer in the present invention, radiation is irradiated to effect cross-linking in the coating layer. Examples of radiation used include the electron beam, γ ray, β ray, ultraviolet ray, etc., and the preferable one is the electron beam. The irradiation dose is preferably 1 to 10 Mrad and more preferably 3 to 7 Mrad. The irradiation energy (acceleration voltage) is preferably 100 kV or more. The radiation is preferably irradiated before winding after coating and drying, but it may be irradiated after winding.

Upper Magnetic Layer

In the present invention, the magnetic layer contains a ferromagnetic powder and a binder resin.

The ferromagnetic powder has the average long axial length of 0.1 μm or less. By using a ferromagnetic powder with a short long axial length, the filling factor of the coating film improves, and the coating film becomes less susceptible to transfer from the back coat layer. Preferred average long axial length values for the ferromagnetic powder are from 0.03 to 0.10 μm. If the average long axial length of the ferromagnetic powder exceeds 0.1 μm, then no improvement is seen in the coating film filling factor, and transfer from the back coat layer becomes more likely. In contrast if the average long axial length is less than 0.03 μμm, then the magnetic anisotropy weakens, making orientation more difficult, and increasing the likelihood of a deterioration in the output.

The ferromagnetic powder may utilize known materials, including fine oxide powders such as γ-$Fe_2O_3$ (maghemite), Co containing γ-$Fe_2O_3$, $Fe_3O_4$ (magnetite), Co containing $Fe_3O_4$, $CrO_2$, $BaOFe_2O_3$ (barium ferrite), and $SrOFe_2O_3$ (strontium ferrite), as well as fine metal powders of metals such as Fe, Co, Ni, or alloys of these metals.

These ferromagnetic powders may be selected in accordance with factors such as the type of medium, although of the above powders, fine powders of metals such as Fe, Co and Ni, or alloys of these metals, are preferred. Powders containing rare earth elements such as Y as a doping element are also preferred. The coercive force of the powder may be appropriately matched to either existing drive systems or drive systems currently under development.

Examples of the binder resins for the magnetic layer include thermoplastic resins, heat curing or reactive heat curing type resins, and electron beam sensitive modified resins, and combinations of these resins may also be used in accordance with the characteristics of the medium and the process conditions.

Furthermore, dispersants such as surfactants, lubricants such as higher fatty acids, fatty acid esters and silicone oil, and various other additives may also be added to the magnetic layer where necessary.

The coating material for forming the magnetic layer is prepared by adding an organic solvent to each of the components described above. There are no particular restrictions on the organic solvent used, and the same solvents as those described for the non-magnetic layer may be used.

The magnetic layer has the thickness of 0.30 μm or less, and preferably within a range from 0.05 to 0.20 μm, and even more preferably from 0.05 to 0.15 μm. If the magnetic layer is too thick then self-demagnetizing loss and thickness loss increase. In contrast if the magnetic layer is too thin, then the strength of the coating film weakens, and the layer becomes more susceptible to transfer from the back coat layer.

In order to be a high recording density medium, the surface roughness (Ra) of the magnetic layer is 2.4 nm or less. If the surface roughness (Ra) of the magnetic layer exceeds 2.4 nm, the roughness of the surface causes an increase in medium noise, resulting in a worse error rate. In relation to the electromagnetic conversion characteristics, the smaller the surface roughness becomes the better, but if the surface roughness (Ra) falls below 1.0 nm, then the friction between the head and the tape increases, which may cause a reduction in the durability. Accordingly, surface roughness (Ra) values for the magnetic layer within a range from 1.0 to 2.4 nm are particularly preferred.

Back-coat Layer

The back-coat layer is provided on the opposite surface of the non-magnetic support to the non-magnetic layer and the magnetic layer for improving the running stability and preventing electrification of the magnetic layer, etc. The back-coat layer preferably contains 30 to 80% by weight of carbon black. When the carbon black content is excessively small, the electrification preventing effect tends to lower, and in addition, the running stability tends to lower. Also the light transmittance of the medium tends to increase, and thereby problems occur in the system for detecting the tape end by the change of light transmittance. On the other hand, when the carbon black content is excessively large, the strength of the back-coat layer lowers, and the running durability tends to degrade. Any kind of carbon black may be used if it is used in general, and the average particle size is preferably about 5 to 500 nm.

The binder resin used in the back coat layer may utilize the same binder resins described above for the magnetic layer.

The coating material for forming the back coat layer is prepared by adding an organic solvent to each of the components described above. There are no particular restrictions on the organic solvent used, and the same solvents as those described for the non-magnetic layer may be used.

Production of a Magnetic Recording Medium

In the present invention, a magnetic recording medium is prepared by forming the non-magnetic layer and the magnetic layer using a wet-on-dry application system. In other words, first, the non-magnetic layer coating material is applied to one surface of the non-magnetic support, dried, subjected to calendering, and then cured to form the lower non-magnetic layer. Subsequently, the magnetic layer coating material is applied to the cured lower non-magnetic layer and then dried to form the upper magnetic layer. Next, the back coat layer coating material is applied to the opposite surface of the non-magnetic support, and then dried to form the back coat layer. Subsequently, heat curing is performed to cure the upper magnetic layer and the back coat layer. Preferably by performing calendering of the lower non-magnetic layer prior to the application and formation of the upper magnetic layer, a smoother magnetic layer surface can be achieved.

In terms of calendering of the upper magnetic layer and the back coat layer, the upper magnetic layer may be subjected to calendering following application and drying of the magnetic layer coating material, and the back coat layer may be subjected to calendering following application and drying of the back coat layer coating material. Alternatively, the magnetic layer coating material may be applied and dried, the back coat layer coating material then applied and dried, and calendering of both the upper magnetic layer and the back coat layer surfaces then performed.

Furthermore, in the present invention, the sequence of the steps for forming the lower non-magnetic layer, forming the upper magnetic layer, and forming the back coat layer typically preferably involves formation of the lower non-magnetic layer, followed by formation of the upper magnetic layer, and then formation of the back coat layer as aforementioned process. However, the back coat layer may also be formed first, followed by formation of the lower non-magnetic layer and the upper magnetic layer. Alternatively, the lower non-magnetic layer may be formed first, followed by formation of the back coat layer and then the upper magnetic layer.

In addition, in the present invention the upper magnetic layer may also be applied, formed and then subjected to heat curing to cure the upper magnetic layer before the back coat layer is applied, formed and heat cured.

By using a wet-on-dry application system, the type of interface disturbance between the non-magnetic layer and the magnetic layer seen in wet-on-wet application systems, where the magnetic layer is applied while the non-magnetic layer is still wet, does not occur. In the present invention, because the non-magnetic layer coating material contains an acicular powder of hydrated iron oxide with excellent dispersibility, the surface smoothness of the lower non-magnetic layer improves, and moreover by using a magnetic powder with a short long axial length in the magnetic layer coating material, the filling factor of the coating film improves. Thus, the coating film becomes less susceptible to transfer from the back coat layer during heat curing in the production process, and during storage in a high temperature, high humidity environment following production. As a result of these factors, a high recording density magnetic recording medium with an ultra smooth magnetic layer surface with a surface roughness (Ra) of 2.4 nm or less, and with excellent electromagnetic conversion characteristics and improved dropout can be obtained.

The application method may utilize any of a variety of known application techniques including gravure coating, reverse roll coating, die nozzle coating, and bar coating.

As follows is a description of the calendering treatment used as a surface smoothing treatment in the steps for forming the lower non-magnetic layer, the upper magnetic layer, and the back coat layer. For the calendering roll, a combination of heat-resistant plastic rolls such as epoxy, polyester, nylon, polyimide, polyamide, polyimideamide, etc. (rolls with carbon, metal, or other inorganic compounds kneaded may be used) and metal rolls (three to seven-high combination) are used. Also, a combination of metal rolls only may be used. The treatment temperature is preferably 70° C. or higher, and more preferably 90° C. or higher. The linear pressure is preferably $1.9 \times 10^5$ N/m (200 kg/cm) or higher, and more preferably $2.4 \times 10^5$ N/m (250 kg/cm) or higher, and the treatment speed is in the range from 20 m/min to 900 m/min.

EXAMPLES

As follows is a more detailed description of the present invention based on a series of examples, although the invention is in no way limited to the examples presented.

Evaluations of the characteristics of magnetic recording media in the examples were conducted in accordance with the following standards.

Surface Roughness: Ra

Ra measurements were conducted using a TALYSTEP system (manufactured by Taylor Hobson Co., Ltd.) in accordance with JIS B0601.

Surface roughness of a non-magnetic layer was measured by sampling from a roll prepared by applying a non-magnetic layer to a non-magnetic support, drying and calendering, and then irradiating with an electron beam.

The surface roughness of a magnetic layer prior to heat curing was measured by sampling from a roll prepared by applying a magnetic layer to the non-magnetic layer and then orienting, drying and calendering, and also applying a back coat layer to the opposite surface of the non-magnetic support and drying and calendering, prior to this roll being subjected to heat curing. The surface roughness (Ra) of the magnetic layer following heat curing was measured by sampling the roll following heat curing. Table 1 shows the magnetic layer surface roughness (Ra) values both before and after heat curing, as well as the variation of the surface roughness (Ra) between before and after heat curing (=surface roughness (Ra) following heat curing—surface roughness (Ra) prior to heat curing). The surface roughness (Ra) of the magnetic layer following heat curing corresponds with the magnetic layer surface roughness value (Ra) described in claim 1 of the invention. Measurement conditions used include filtering of 0.18 to 9 Hz, a $0.1 \times 2.5$ $\mu$m stylus, a stylus pressure of 2 mg, a measurement speed of 0.03 mm/sec, and a measurement length of 500 $\mu$m.

Electromagnetic Conversion Characteristics

Using a MS4500 manufactured by MEDIASCOPE International Inc., and a C5683A drive manufactured by Hewlett Packard Corporation, the 20 MHz (recording wavelength 0.67 $\mu$m) output ($\mu$V) at a recording current of 30 mA was measured, and the output ratio relative to a reference tape was determined as a dB value.

Dropout

Evaluations of dropout were performed in a MS4500 manufactured by MEDIASCOPE International Inc., using a C5683A drive manufactured by Hewlett Packard Corporation. A signal of frequency 20 MHz (recording wavelength 0.67 μm) was input at a recording current of 30 mA, and with the threshold level set to 50%, the number of dropouts over 20,000 tracks was measured.

Example 1

A magnetic recording medium was prepared in the manner described below.

(Non-magnetic layer coating material)

Non-magnetic powder:

| | |
|---|---|
| acicular goethite (BET specific surface area: 63 m$^2$/g, long axial length: 0.1 μm, crystalline diameter: 13 nm, pH: 8.5) | 80 parts by weight |
| carbon black (manufactured by Mitsubishi Chemical Corporation, #950B) (particle size: 17 nm, BET value: 250 m$^2$/g, DEP oil absorption: 70 ml/100 g, pH: 8) | 20 parts by weight |

Resin:

| | |
|---|---|
| vinyl chloride type resin (manufactured by Toyobo Co., Ltd., TB-0246) (a copolymer of vinyl chloride and an epoxy containing monomer, average degree of polymerization: 310, epoxy content: 3% (mass percent), potassium persulfate used. S content: 0.6% (mass percent), MR110 manufactured by Zeon Corporation was acrylic modified, using 2-isocyanate ethylmethacrylate (MOI), acrylic content: 6 mol/1 mol) | 11 parts by weight (solid fraction) |
| polyurethane resin (manufactured by Toyobo Co., Ltd., TB-0216) (hydxoxy-containing acrylic compound - phosphonic acid group containing phosphorus compound - hydroxy-containing polyester polyol, average molecular weight Mn: 13,000, P content: 0.2% (mass percent), dissolved in a MEK/toluene = 1/1 (weight ratio) mixed solvent (solid fraction concentration: 35% (mass percent), acrylic content: 8 mol/1 mol) | 9 parts by weight |

Dispersant:

| | |
|---|---|
| RE610 manufactured by Toho Chemical Industry Co., Ltd. | 1.2 parts by weight |
| phenylphosphonic acid | 2 parts by weight |

Abrasive:

| | |
|---|---|
| α-alumina (HIT60A, manufactured by Sumitomo Chemical Co., Ltd., average particle size: 0.20 μm) | 4 parts by weight |

Lubricant:

| | |
|---|---|
| stearic acid: NAA180, manufactured by NOF Corporation | 2 parts by weight |
| fatty acid amide: Fatty acid amide S, manufactured by Kao Corporation (stearic acid amide 66%, palmitic acid amide 30%) | 1 part by weight |
| butyl stearate: Butyl stearate S. manufactured by Nippon fine Chemical Co., Ltd. NV (solid fraction concentration) = 20% (mass percent) Solvent ratio: MEK/toluene/cyclohexane = 2/2/1 (weight ratio) | 1 part by weight |

The components listed above were kneaded together in a kneader and then dispersed using a horizontal pin mill 80% filled with zirconia beads of diameter 0.8 mm (void fraction 50 vol %), and finally, the lubricants and the solvents were added and the viscosity was adjusted, yielding a non-magnetic layer coating material.

(Magnetic layer coating material)

| | |
|---|---|
| Ferromagnetic powder: Fe type acicular magnetic powder (containing 24 at % of Co relative to Fe, Al = 5/(Fe + Co) wt %, Y = 8/(Fe + Co) at %, Hc: 194 kA/m, σs: 140 Am$^2$/kg, BET value: 56 m$^2$/g, long axial length: 0.075 μm, crystalline diameter: 13 nm, pH: 9.4) | 100 parts by weight |

Resin:

| | |
|---|---|
| vinyl chloride type copolymer (MR110, manufactured by Nippon Zeon Corporation) (vinyl chloride/2-HEMA/AGE/molecular terminal —OSO$_3$K = 84.5/4.5/7.4/0.36) | 14 parts by weight |
| polyester polyurethane resin (UR8200, manufactured by Toyobo Co., Ltd.) (containing —SO$_3$Na groups, average molecular weight Mn: 20,000) | 2 parts by weight |

Dispersant:

| | |
|---|---|
| organic phosphoric acid compound (RE610, manufactured by Toho Chemical Industry Co.. Ltd.) | 3 parts by weight |

Abrasive:

| | |
|---|---|
| aluminum oxide (HIT82, manufactured by Sumitomo Chemical Co., Ltd., average particle size: 0.12 μm) | 4 parts by weight |

Lubricant:

| | |
|---|---|
| stearic acid: NAA180, manufactured by NOF Corporation | 1.2 parts by weight |
| butyl stearate: Butyl stearate-S manufactured by Nippon Fine Chemical Co., Ltd. | 1 part by weight |
| Curing agent: C-3041, manufactured by Nippon Polyurethane Industry Co., Ltd. NV = 16% Solvent ratio: MEK/toluene/cyclohexane = 1/1/3 (weight ratio) | 4 parts by weight |

The components listed above were kneaded together in a kneader, dispersed using a horizontal pin mill, and the viscosity was finally adjusted, yielding a magnetic layer coating material.

(Back coat layer coating material)

| | |
|---|---|
| carbon black BP-800, manufactured by Showa Cabot Co., Ltd. (average particle size: 17 nm, DBP oil absorption: 68 ml/100 g, BET specific surface area: 210 m$^2$/g) | 75 parts by weight |
| carbon black BP-130, manufactured by Showa Cabot Co., Ltd. (average particle size: 75 nm, DBP oil absorption: 69 ml/100 g, BET specific surface area: 25 m$^2$/g) | 10 parts by weight |
| calcium carbonate Homocal D, manufactured by Shiraishi Group (average particle size: 70 nm) | 15 parts by weight |

Resin:

| | |
|---|---|
| nitrocellulose (BTH1/2, manufactured by Asahi Kasei Corporation) | 55 parts by weight |
| polyurethane (UR-8700, manufactured by Toyobo Co., Ltd.) | 35 parts by weight |
| Curing agent: C-3041, manufactured by Nippon Polyurethane Industry Co., Ltd. NV = 11.5% Solvent ratio: MEK/toluene/cyclohexane = 53/40/7 (weight ratio) | 4 parts by weight |

The components listed above were kneaded together in a kneader, subsequently dispersed using a side grind mill, and the viscosity was finally adjusted, yielding a back coat layer coating material.

Preparation of a Magnetic Tape Sample

The non-magnetic layer coating material was applied to one surface of a polyamide support having a thickness of 4.4 μm with a nozzle coater, so as to produce a thickness following calendering of 0.7 μm, and this material was then dried. Subsequently, the material was subjected to calendering treatment, and was then irradiated with 4.5 Mrad using an electron beam to cure the material, thereby forming a non-magnetic layer. The surface roughness (Ra) of the non-magnetic layer at this point was 2.0 nm.

The magnetic layer coating material was then applied to the formed non-magnetic layer with a nozzle coater, so as to produce a thickness following calendering of 0.15 μm, and the material was oriented, dried and subjected to calendering treatment. In addition, the back coat layer coating material was applied to the opposite surface of the polyamide support with a nozzle coater, so as to produce a dried thickness of 0.5 μm, and the material was then dried and subjected to calendering treatment. The surface roughness (Ra) of the magnetic layer at this point was 1.8 nm.

The tape original prepared in this manner was then subjected to heat curing at 60° C. for 48 hours. The surface roughness (Ra) of the magnetic layer following heat curing was 1.8 nm. Subsequently, the tape was cut into strips of width 3.8 mm to prepare DDS4 tapes of the example 1. The surface roughness (Ra) of the magnetic layer of the tapes at this point was 1.8 nm.

Examples 2 to 4

As shown in Table 1, with the exceptions of altering the acicular goethite of the example 1 to a material with a different long axial length, and/or altering the ferromagnetic powder to a Fe type acicular magnetic powder with a different long axial length, magnetic tape samples were prepared in the same manner as the example 1.

Comparative Example 1

As shown in Table 1, with the exception of altering the ferromagnetic powder of the example 1 to a Fe type acicular magnetic powder with a long axial length of 0.120 μm, a magnetic tape sample was prepared in the same manner as the example 1.

Comparative Example 2

As shown in Table 1, with the exception of using acicular hematite for the non-magnetic layer coating material, instead of the acicular goethite of the example 1, a magnetic tape sample was prepared in the same manner as the example 1.

TABLE 1

| | Long axial length of ferromagnetic powder of magnetic layer (μm) | Non-magnetic powder of non-magnetic layer | | Surface roughness of non-magnetic layer Ra (nm) | Magnetic layer surface roughness | | | | |
|---|---|---|---|---|---|---|---|---|---|
| | | Type | Long axial length (μm) | | Ra (nm) before heat curing | Ra (nm) after heat curing | Variation (nm) | Output (dB) | Dropout |
| Example 1 | 0.075 | acicular goethite | 0.10 | 2.0 | 1.8 | 1.8 | 0 | 0.8 | 800 |
| Example 2 | 0.100 | acicular goethite | 0.10 | 2.0 | 1.8 | 1.9 | 0.1 | 0.6 | 1000 |
| Example 3 | 0.075 | acicular goethite | 0.15 | 2.1 | 1.9 | 1.9 | 0 | 0.6 | 800 |
| Example 4 | 0.075 | acicular goethite | 0.05 | 1.9 | 1.7 | 1.7 | 0 | 1.0 | 750 |
| Comparative example 1 | 0.120 | acicular geothite | 0.10 | 2.0 | 1.9 | 2.5 | 0.6 | 0.0 | 4000 |
| Comparative example 2 | 0.075 | acicular hematite | 0.10 | 2.5 | 2.3 | 2.6 | 0.3 | −0.1 | 3000 |

From Table 1 it is evident that all of the samples from examples 1 through 4 have high outputs and low rates of dropout. The surface roughness (Ra) values for the magnetic layer also displayed either no, or extremely little, variation between before and after heat curing. In other words, during heat curing of the tape during magnetic tape production, no transfer occurred from the back coat layer to the surface of the magnetic layer. The sample from the example 4 was particularly superior with a very high output.

In contrast, the samples of the comparative examples 1 and 2 displayed inferior output and dropout results when compared with the samples of the examples 1 to 4.

What is claimed is:

1. A magnetic recording medium comprising a lower non-magnetic layer containing at least a non-magnetic powder and a binder resin on one surface of a non-magnetic support, an upper magnetic layer containing at least a ferromagnetic powder and a binder resin on said lower non-magnetic layer, and a back coat layer on an opposite surface of said non-magnetic support, wherein said lower non-magnetic layer contains an acicular powder of hydrated iron oxide as the non-magnetic powder, said ferromagnetic powder has an average long axial length of 0.1 μm or less, and said upper magnetic layer has a surface roughness (center line average roughness: Ra) of 2.4 nm or less.

2. The magnetic recording medium according to claim 1, wherein said acicular powder of hydrated iron oxide has an average long axial length of 0.15 μm or less.

3. The magnetic recording medium according to claim 1, wherein said lower non-magnetic layer has a surface roughness (center line average roughness: Ra) of 2.7 nm or less.

4. The magnetic recording medium according to claim 1, wherein said binder resin of said lower non-magnetic layer is a radiation curing type binder resin.

5. The magnetic recording medium according to claim 1, wherein said upper magnetic layer has a thickness of 0.2 μm or less.

6. A process for producing a magnetic recording medium comprising the steps of:

forming a lower non-magnetic layer by applying a non-magnetic layer coating material containing at least a non-magnetic powder containing an acicular powder of hydrated iron oxide and a binder resin to one surface of a non-magnetic support, and drying and curing said non-magnetic layer coating material, forming an upper magnetic layer by applying a magnetic layer coating material containing at least a ferromagnetic powder with an average long axial length of 0.1 μm or less and a binder resin onto said lower non-magnetic layer, and drying said magnetic layer coating material, forming a back coat layer by applying a back coat layer coating material to an opposite surface of said non-magnetic support, and drying said back coat layer coating material, and conducting heat curing treatment following completion of said steps.

* * * * *